United States Patent [19]
Brown

[11] 3,961,429
[45] June 8, 1976

[54] EXCAVATING DEVICE

[76] Inventor: Stanley L. Brown, R.R. No. 1, Lenox, Iowa 50851

[22] Filed: Jan. 6, 1975

[21] Appl. No.: 538,897

[52] U.S. Cl. ............................ 37/80 R; 37/DIG. 17
[51] Int. Cl.² .................................... E02F 5/02
[58] Field of Search ............. 37/80 R, 89, DIG. 17, 37/DIG. 7

[56] References Cited
UNITED STATES PATENTS

| | | | |
|---|---|---|---|
| 2,084,887 | 6/1937 | Bennett | 37/DIG. 17 |
| 2,708,800 | 5/1955 | Logus | 37/DIG. 17 |
| 2,749,756 | 6/1956 | George | 37/DIG. 17 |
| 2,771,958 | 11/1956 | Ball | 37/DIG. 7 |
| 2,783,556 | 3/1957 | Burns et al. | 37/DIG. 17 |

Primary Examiner—Stephen C. Pellegrino
Attorney, Agent, or Firm—Zarley, McKee, Thomte & Voorhees

[57] ABSTRACT

The excavating device of the present invention comprises a frame having front and rear wheels, a winch, an excavating implement, and a central power unit thereon. A transmission is connected to the central power unit and includes a first output shaft and a power takeoff shaft. The power takeoff shaft is connected to means for driving both the front and rear wheels and also to means for driving the winch. The first output shaft of the transmission is directly connected to the implement.

2 Claims, 3 Drawing Figures

EXCAVATING DEVICE

SUMMARY OF THE INVENTION

This invention relates to excavating devices and particularly to heavy ditch digging equipment.

Prior devices included many transmissions, often as many as six for driving the ditching implement and also for driving the various wheels and winches. Because six transmissions are used, the prior devices are extremely heavy and include a great number of draft shafts, many of which must bend and turn in order to fit around the bulky and space-consuming equipment. One primary disadvantage of these prior devices is the inability to have a continuous adjustment of the speed of the winch and the wheels. While the speed may be varied in increments by shifting the various transmissions, there is no continuous infinite adjustability of these components. Furthermore, the prior devices included an overwhelming number of controls, gearshifts and gear boxes, thereby making operation an extremely difficult task.

The present invention utilizes hydraulic motors in the place of the many transmissions of prior devices. It reduces the number of transmissions to one and therefore greatly simplifies the numbers of gear boxes and controls which are necessary.

Therefore, an object of the present invention is to provide an excavating device which is simpler in construction than prior devices.

A further object of the present invention is the provision of a device which reduces the number of transmissions, gear boxes, and controls from those provided in the prior devices.

A further object of the present invention is the provision of a device which provides positive infinite control over the speed of winch and the wheels.

A further object of the present invention of the provision of a device which eliminates the necessity for crooked driveshafts having a plurality of universal joints therein.

A further object of the present invention is the provision of a device which reduces the weight from prior excavating devices.

A further object of the present invention is the provision of a device which is far simpler to control than prior devices.

A further object of the present invention is to provide a device which is simple in construction, economical to manufacture, and durable in use.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings in which:

DETAILED DESCRIPTION OF THE DRAWINGS

Figure 1:
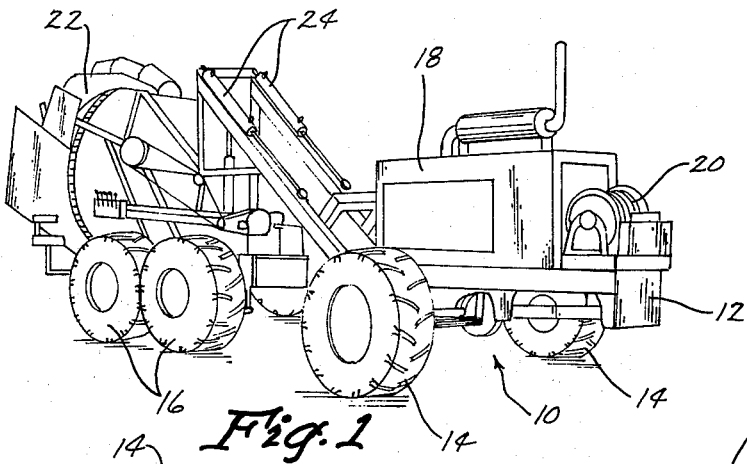
FIG. 1 is a perspective view of the excavating device of the present invention.
Figure 2:
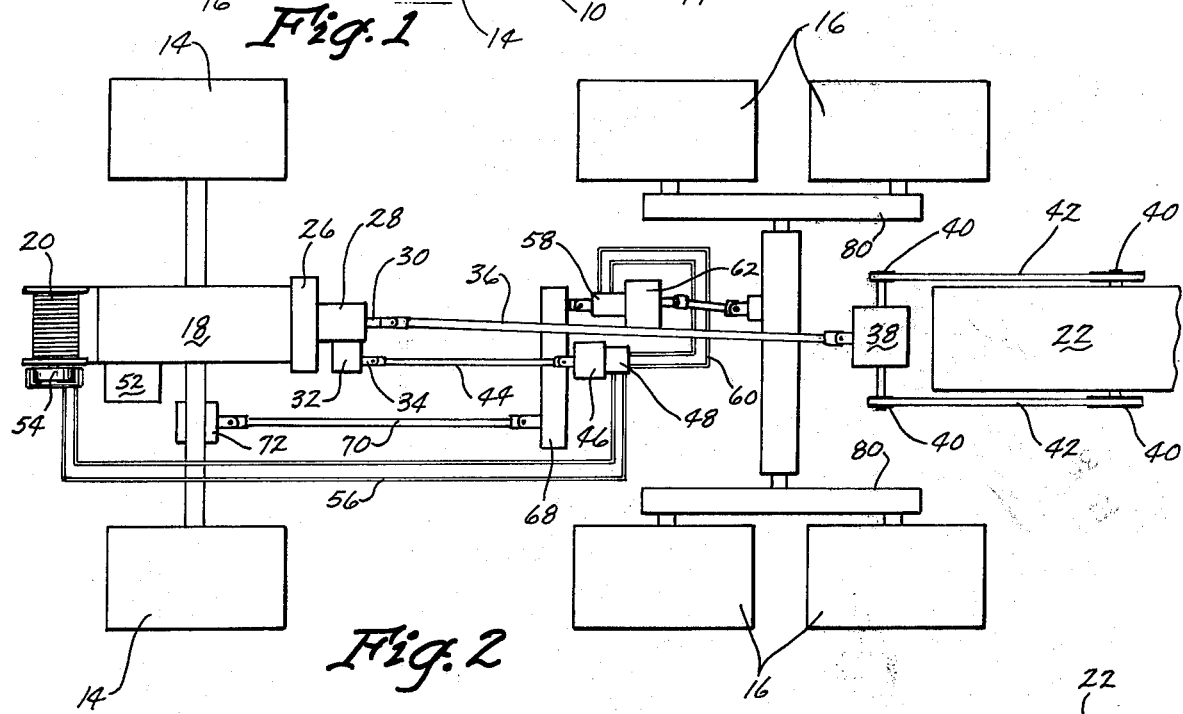
FIG. 2 is a schematic top view of the various components of the present invention.
Figure 3:
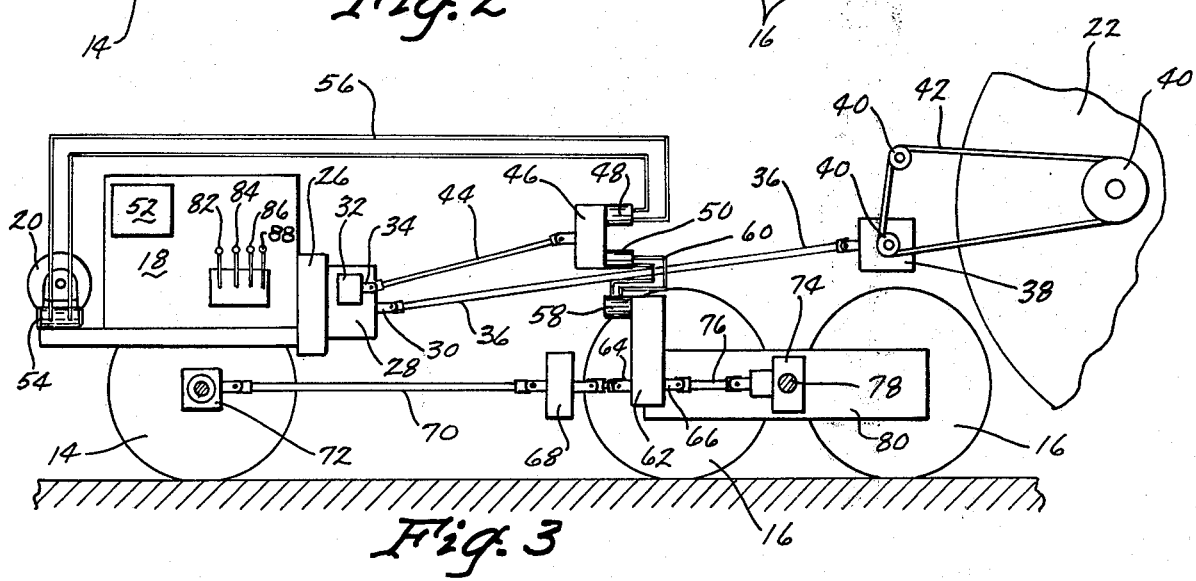
FIG. 3 is a schematic side view of the various components of the present invention.

Referring to the drawings, the number 10 generally designates the excavating device of the present invention. Device 10 comprises a frame 12 having front and rear wheels 14, 16, a central power plant 18, a winch 20, and an excavating implement 22. Excavating implement 22 is adapted to be raised and lowered relative to the ground to provide excavation to the desired depth. A pair of cylinders 24 are adapted to raise and lower implement 22. These cylinders are actuated by spool valve (not shown) in front of the operator, and are of conventional construction not important to the present invention.

A clutch 26 interconnects power plant 18 to a transmission 28. Transmission 28 includes a first output shaft 30 and also includes a gear box 32 mounted on its side. Gear box 32 includes a power takeoff shaft 34 which is driven from transmission 28 through gear box 32. Gear box 32 may be disengaged independently of transmission 28 by means not shown. Thus it is possible to disengage both gear box 32 and transmission 28 by disengaging clutch 26 and it is also possible to disengage gear box 32 independently of transmission 28 by the means previously described.

Connected to first output shaft 30 by suitable universal joints is an implement driveshaft 36. Shaft 36 extends rearwardly from transmission 28 and is connected by suitable universal joint means at its rear end to an implement drive differential 38. Drive differential 38 is drivingly connected to implement 22 by means of conventional sprockets 40 and chain 42. Thus it can be seen that implement 22 is driven directly by the output shaft from transmission 28.

A wheel and winch driveshaft 44 is connected at its forward end to power takeoff shaft 34 by universal joint means and is similarly connected at its rearward end to a dual pump drive 46. Dual pump drive 46 includes two output shafts, one of which is connected to a winch pump 48 and the other of which is connected to a wheel pump 50. Pumps 48, 50 are hydraulic pumps and are connected in a hydraulic circuit with a hydraulic reservoir 52. Winch pump 48 is connected to a hydraulic winch motor 54 by hydraulic connecting lines 56. Winch motor 54 is drivingly connected to winch 20.

Wheel pump 50 is connected to a hydraulic wheel motor 58 by a pair of hydraulic connecting lines 60. Wheel motor 58 is drivingly connected to a drop gear box 62 which includes a forwardly extending output shaft 64 and a rearwardly extending output shaft 66 at its lower end. Forward output shaft 64 is connected to a chain and sprocket box 68 which in turn is connected to a forwardly extending straight front wheel driveshaft 70. The forward end of driveshaft 70 is connected to front wheel differential 72 so as to drive front wheels 14.

The rear output shaft 66 is directly connected to a rear wheel differential 74 by means of a rear wheel drive shaft 76. Differential 74 drives a tandem axle 78 which in turn drives a tandem motor 80 so as to rotate wheels 16.

The components previously described are controlled by four basic controls. Winch control 82 controls the output from winch pump 48 so as to provide an infinite positive control of the speed of winch 20. Winch 20 is normally connected to an anchor and is used to help pull device 10 along a predetermined path during the time that implement 22 is in operation to excavate the ground. It is often desirably to have an infinite positive control over the speed at which winch 20 pulls device 10 along this predetermined path.

A wheel control 84 is connected to wheel pump 50 for varying the output from pump 50 so as to drive wheel 16 and 14 at the desired speed. It is important that wheels 14 and 16 be operable independently of winch 20 so as to permit the operator to vary the stress on the cable being would around winch 20.

A clutch control 86 is used to engage and disengage clutch 26, and by doing so, provides a master control for shutting the power train off to all of the components of the present invention. A power takeoff control (not shown) is connected to gear box 32 for disengaging gear box 32 from transmission 28 thereby providing an independent control over wheels 14, 16 and winch 20. Thus inplement 22 is free to operate independently of the wheels and the winch. A drive control 88 is connected to gear box 62 and provides the operator with a variety of ratios to accomplish not only the slow travelling speeds for digging but also rapid travelling speeds for transportation of the device.

The present invention utilizes only one transmission 28 rather than the plurality of transmissions which are utilized in prior devices. It provides a positive infinite control over the speed of the winch and the wheels and furthermore, eliminates the necessity for the many crooked driveshafts found in many prior devices. It reduces the weight over that of the previous devices and increases the simplicity of operation and control during the excavating operation. Thus it can be seen that the device accomplishes at least all of its stated objectives.

What is claimed is:

1. An excavating device comprising:
   a frame having forward and rearward ends and front and rear wheels,
   a winch mounted on said frame;
   an excavating implement mounted on said frame for engaging and excavating the ground;
   a hydraulically actuated wheel drive mechanism drivingly connected to said front and rear wheels for causing movement of said frame across the ground,
   said wheel drive mechanism comprising a hydraulic wheel pump drivingly connected to a hydraulic wheel motor, said wheel motor being drivingly connected to a gear box having two output shafts, means connecting one of said output shafts to said front wheels and the other of said output shafts to said rear wheels,
   said connecting means comprising a chain and sprocket mechanism driven by said one output shaft, an elongated straight drive shaft connected to and driven by said chain and sprocket mechanism, said straight shaft extending forwardly and being drivingly connected to said front wheels by a front wheel differential;
   a hydraulically actuated winch drive mechanism connected to said winch, said winch mechanism including a hydraulic winch pump;
   an implement drive mechanism connected to said implement;
   a central power unit having a transmission means connected thereto, said transmission means having a first output shaft and a power takeoff shaft;
   means connecting said first output shaft to said implement drive mechanism for driving said implement;
   means connecting said power takeoff shaft to both said wheel pump and said winch pump, and
   separate control means associated with said winch pump and said wheel pump for individually controlling the speed at which said wheels and said winch are driven.

2. An excavating device comprising:
   a frame having forward and rearward ends and front and rear wheels,
   a winch mounted on said frame,
   an excavating implement mounted on said frame for engaging and excavating the ground;
   a wheel drive system comprising a hydraulic wheel pump hydraulically connected to a hydraulic wheel motor means, a wheel drive mechanism driven by said wheel motor means and connected to said wheels for driving said wheels;
   a winch drive system comprising a hydraulic winch pump hydraulically connected to hydraulic winch motor means for driving said winch;
   an implement drive mechanism connected to said implement;
   a central power unit having a transmission means connected thereto, said transmission means having a first output shaft and a power takeoff shaft;
   dual pump drive means operatively connected to said power takeoff shaft and to said wheel pump and said winch pump whereby said power takeoff shaft drives said wheel pump and said winch pump;
   connecting means connecting said implement drive mechanism to said first output shaft of said transmission;
   separate hydraulic control means associated with said winch pump and said wheel pump for individually controlling the speed at which said wheels and said winch are driven.

* * * * *